Dec. 15, 1942.  C. G. KEITH  2,304,929
CENTRIFUGAL LIQUID EXTRACTOR
Filed Sept. 19, 1938  2 Sheets-Sheet 1

CLINTON G. KEITH
Inventor

By Herbert E. Smith

Attorney

Dec. 15, 1942.   C. G. KEITH   2,304,929
CENTRIFUGAL LIQUID EXTRACTOR
Filed Sept. 19, 1938   2 Sheets—Sheet 2

CLINTON G. KEITH
Inventor

By *Herbert E. Keith*

Attorney

Patented Dec. 15, 1942

2,304,929

UNITED STATES PATENT OFFICE 2,304,929

CENTRIFUGAL LIQUID EXTRACTOR

Clinton G. Keith, Yakima, Wash.

Application September 12, 1938, Serial No. 230,619

6 Claims. (Cl. 146—76)

This invention relates to a centrifugal liquid extractor and has been particularly designed for the reduction of solid vegetable and fruit matter to a pulp and the subsequent extraction and separation of the liquid matter from the reduced and disrupted cell structure, whereby beneficial fruit and vegetable juices may be produced, together with the production of a pulp residue having an extremely low moisture content.

Currently, dieticians and specialists in the field of medicine are encouraging the adoption of diets largely composed of liquids extracted from vegetables, such as carrots, beets, celery, etc., and from fruits such as apples and the like. The efficacy of such juices depends upon their availability in an extremely fresh state. Repeated tests have confirmed the fact that fruit juices within a very few hours after their extraction from the mass comprising their normal raw state will dissipate through volatilization the majority of the desirable characteristics, namely, vitamins, etc. The freshly extracted juices produced by my machine contain all of the healthful food properties of the original fruit and are marked by a total absence of discoloration which results from oxidation and a bouquet or aroma not present after the cookery extraction or cooking is maintained and carried over into the fresh juices. It should be apparent that the extraction of such juices as has been mentioned herein should be closely coupled with the time at which such juices are to be consumed.

It has therefore been a prime object of my invention to design a centrifugal extractor capable of being manufactured at a low cost, for sale as a household appliance for use in the home, diet kitchen, restaurant, and lunch counter.

Another object of my invention has been to provide a machine of this type which successively tear and disrupt the cells of the vegetable and fruit matter through an extractor to the end that a continuous operation results.

Another object of my invention has been the provision of a machine for centrifugal extraction of fruit and vegetable juices, whereby the material passes through the machine rapidly and the juice is withdrawn at one outlet and the pulp discharged at another point to eliminate the carrying of unnecessary and excessive weights of dehydrated matter within the machine.

A still further object of my invention has been to provide a machine of the character described, which is simple of construction, having a minimum number of operating parts, and capable of being dismantled simply for ease in cleansing.

As a result of my experiments and use of the principles of this invention I have determined and incorporated in my device as a principal object, shredding means whereby the cell structure of the material from which it is desirable to extract juices is destroyed and disrupted by impact, as compared with the majority of extraction methods that comprise cutting knives.

In the accompanying drawings, forming a part of this specification, and in which like numerals are employed to designate like parts throughout the same, Figure 1 is an elevational view of the device of my invention;

Figure 1:
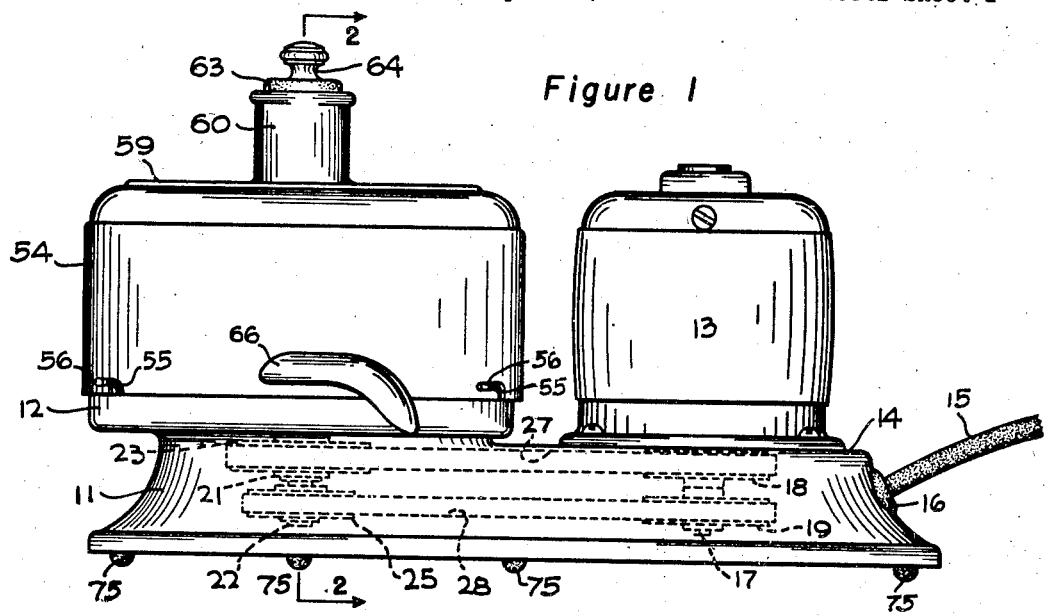
Figure 2:
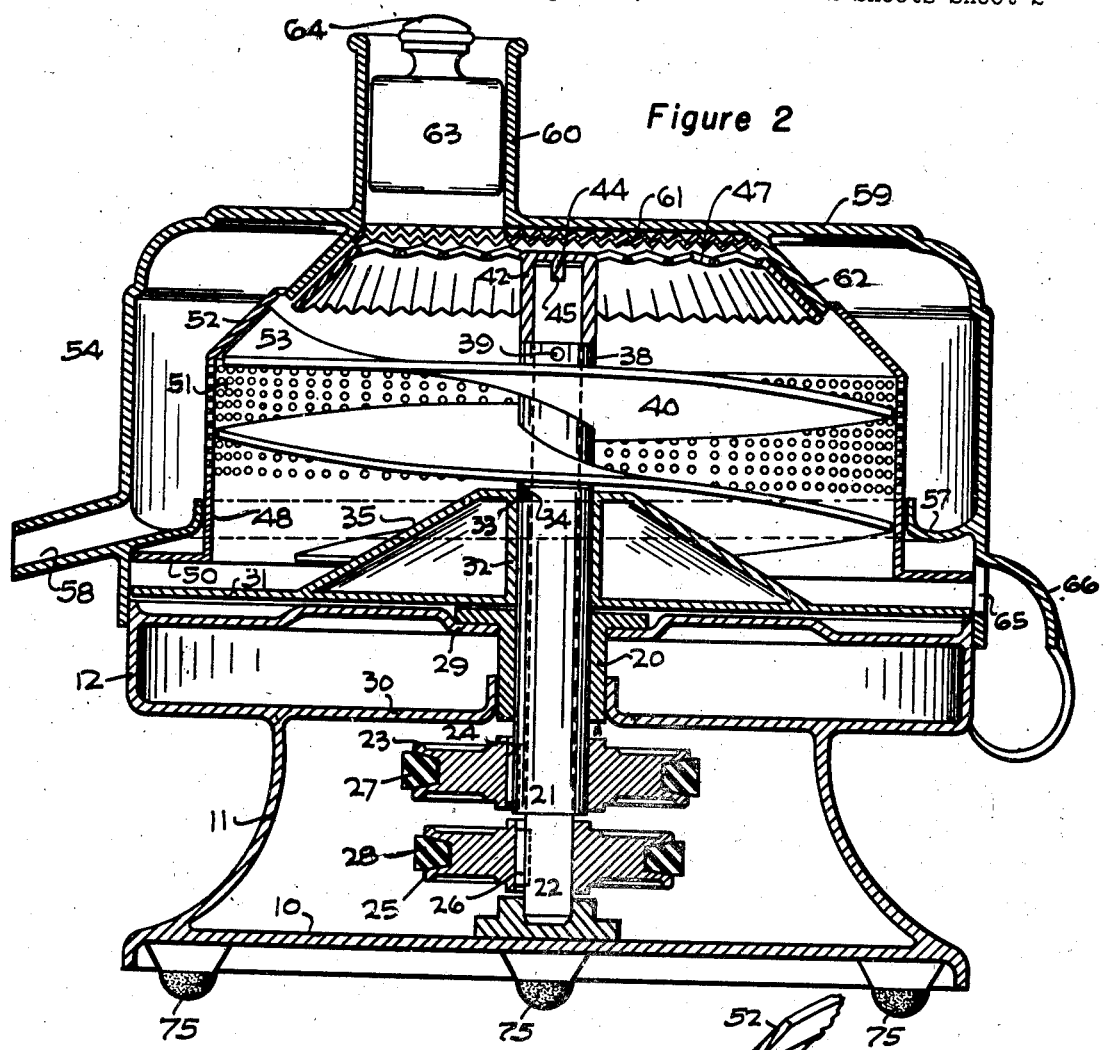
Figure 2 is a vertical, sectional view through the machine, taken on lines 2—2 of Figure 1.
Figure 6:
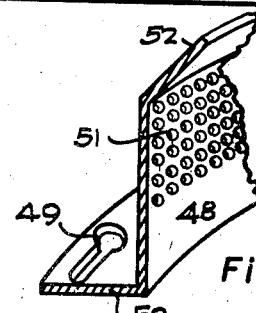
Figure 6 is a fragmentary, sectional, elevational view through a portion of the revolving screen utilized in my device.
Figure 7:
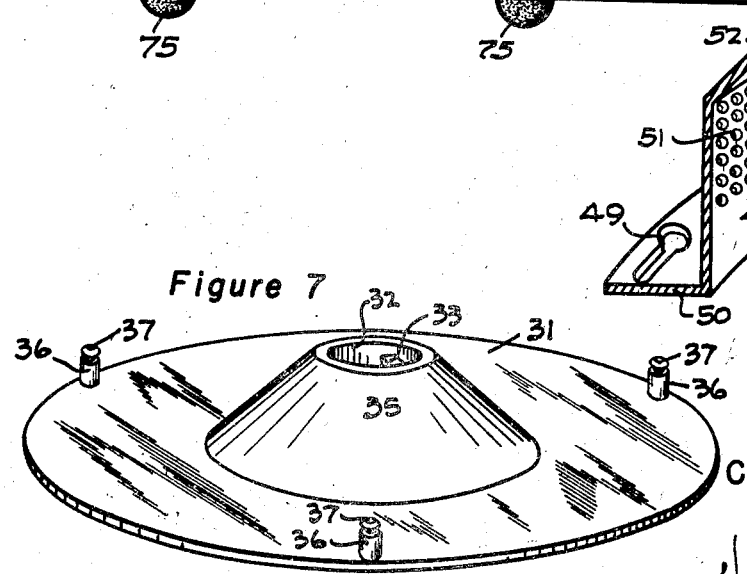
Figure 7 is a perspective view of the spinner disk forming the base structure of my centrifugal extractor.

Referring now to Figures 1 and 2, the numeral 10 designates a base of the device having upward and inward flaring side walls 11; and number 12 indicates a bearing supporting housing adapted to carry the revolving mechanism of my invention. A motor 13 is mounted upon a horizontal base 14 unitarily constructed as a part of the base 10. An electric inlet cord 15 is attached to the base wall 11 through means of the ferrule 16 and is suitably connected by wires (not shown) to the motor 13.

The central motor shaft 17 extends downwardly from the motor into the housing formed within the walls 11 and securely keyed thereto are pulleys 18 and 19. Within the housing 12 I provide a flanged supporting bearing 20 in which is journalled a tubular shaft 21. Within the tubular shaft 21 is journalled a smaller shaft 22 extending below and above the shaft 21. A pulley 23 is secured to the shaft 21 by means of the key 24 and a pulley 25 is secured to the shaft 22 by means of the key 26. The belt 27 transmits power from the pulley 18 to the pulley 23 and the belt 28 in the same manner transmits power from the pulley 19 to the pulley 25. It will be noted that the pulley 25 is drawn as slightly smaller than the pulley 23 to provide a differential in the rotation of the shafts 21 and 22, but it will, of course, be understood that this differential may be accomplished by changing the sizes of pulleys 18 and 19 as well. The bearing 20 is supported between the upper plate 29 and the lower plate 30, comprising the top and bottom of the housing 12.

A spinner plate 31 is supported in a horizontal plane about the shaft 21 and the bushing 32 engages the shaft 21 and is keyed thereto by means of the lug or dog 33 engaging a notch 34 in the shaft.

For the purpose of shedding moisture and pulp the disk 31 may be provided with a cone 35 which also serves to maintain the bushing 32 in a fixed location and to relieve it from stresses and strains. The disk 31 is further provided with bosses 36 having pin heads 37. A bushing 38 encircles the upper portion of the shaft 22 and is secured thereto by means of the key 39. A spiral feeder and scraper means 40 is securely attached to the bushing 38 and is revolved with the turning of the shaft 22.

Figure 3:
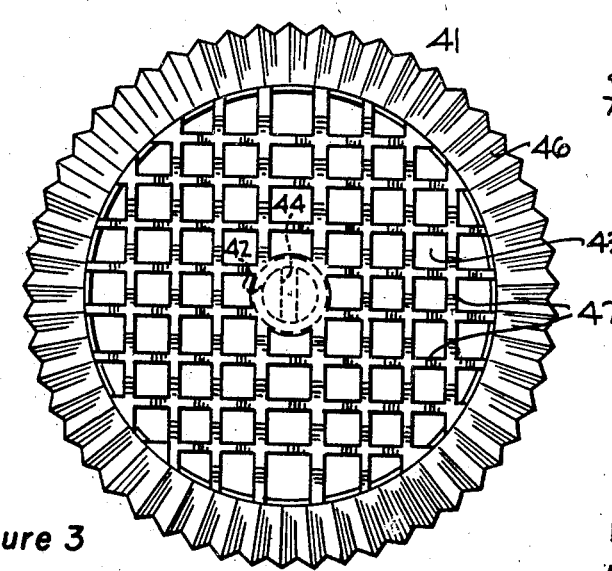
Figure 3 is a plan view of one form of the shredder of my invention.
Figure 5:
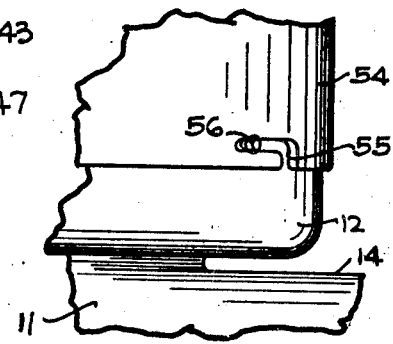
Figure 5 is a fragmentary, elevational view of a portion of the housing.

The shredder element of Figure 3 indicated as a whole by the numeral 41 comprises the central hub 42 having an upper shredding surface as 43 secured to the hub. A lug 44 engages a notch 45 in the upper end of the shaft 22 to securely lock the shredder element 41 to the shaft 22. The shredder element is further provided with an outwardly flaring corrugated skirt 46. The webs of the shredder element 43 are corrugated as at 47 and in this manner an uneven shredding surface has been devised.

A cylindrical flanged screen 48 is secured to the plate 31 through the engagement of the bayonet slots as 49, in the flange 50, with the pin headed bosses 36 thus forming a pulp discharge passage. The rotatable screen 48 is provided with a perforated area 51 and an upward, inwardly flaring edge 52. The upper terminal end of the spiral 40 is extended laterally and by means of the twisted portion 53 a scraper is provided for close engagement with an inward flare 52 of the rotating screen.

The cylindrical housing 54 encloses the operating mechanism of my invention and is secured to the housing 12 by means of L-shaped slots 55 engaging retaining pins 56 on the housing 12. The interior of the housing 54 has an inner sloping cup flange 57 terminating in a liquid discharge spout 58.

In the upper face 59 of the housing 54 and to one side of the center thereof is the feed tube 60 through which material to be shredded may be fed. The corrugated surface 61 is secured to the underside of the housing and in close proximity to the shredder element 41. An outward, circular flaring flange 62 depends from the underside of the housing top 59 and completely encircles the corrugated skirt 46 of the shredder element, in relatively close proximity. The skirt or flange 62 may be corrugated similar to the skirt 46. A presser block 63 is inserted into the tube 60 and may be extracted therefrom by means of the nob 64. One side of the housing 54 has an elongated slot 65 adjacent the discharge end of the plate 31 and the discharge hood 66 covers the slot 65 for reasons to be later described.

Figure 4:
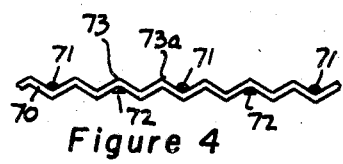
Figure 4 is a fragmentary section of a type of screen which may be utilized in an alternative form of my shredder of Figure 3.

Under certain circumstances the corrugated surface 43 of the shredder may be formed by punching or drawing metal substantially as is shown in Figures 2 and 3. In Figure 4 I have indicated a section of an alternate screen which in certain details is similar to standard wire mesh, but which, it is to be pointed out, varies in the manner in which the wires are crossed to form shredding corrugations.

An angularly bent cross wire 70 is intersected at spaced points by wires 71 and 72. It will be noted that between a pair of wires, as 71 and 72, there is a pair of bands as 73 and 73a forming an extremely rough shredding surface. Under certain circumstances the wire as 70 or 71 are hemispherical in cross section and this hemispherical shape may also be utilized in the members 47 forming parts of the pressed metal shredder of Figure 3.

Suitable rubber cushion buttons 75 are secured to the underside of the base 10 of my device for the purpose of deadening any vibration that may arise for the protection of table surfaces upon which the device may be placed or operated.

Method of operation

The device of Figure 1 is mounted upon a suitable working surface and the cord 15 is connected to an electrical outlet means to the end that the motor 13 is started in operation. Through the means of the pulleys 18 and 19, the belts 27 and 28 and the pulleys 23 and 25, the revolving elements of my shredder and extractor are caused to rotate within the housing 54. The plug 63 is withdrawn from the feed tube 60 and whole or partially cut vegetables are inserted into the hole. The plug 63 is re-inserted into the feed tube in order that pressure may be applied upon the material being shredded.

The best operation of my device has been accomplished when the shaft 22 which operates to revolve the shredder and the spiral scraper blade is rotated at a relatively high speed and to a degree in excess of the speed imparted upon the centrifugal screen bowl.

The bottom surface of the material being fed into the tube 60 is contacted by the corrugated shredder surface 43 and because of the roundness of the corrugated webs the impact of the shredder webs upon the material crushes, bruises, and disrupts the cells to such a fine degree that there is left no whole cell in the resulting pulp. The material falls downward through the interstices of the shredder and is either deposited upon the rotating spiral scraper blade, or thrown outwardly against the flange 52 which is a part of the perforated centrifugal separator in which instance the scraper portion 53 of the spiral 40 scrapes the material downwardly and into contact with the perforations. The revolutions imparted to the disk 31 and the spaced perforated bowl 48 cause the material to adhere to the inner surface of the bowl against the perforations, but because of the centrifugal action the water content or juice is thrown outward through the screen. Due to the speed differential on the shafts 21 and 22 there is a differential between the rotary scraper and the spinner disk 31, and perforated bowl whereby although the two are revolving in the same direction, the spiral tends to lead the separator bowl and urge the pulp material clinging to the inner surface of the bowl downwardly and across the perforated area to the bottom edge of the bowl formed by the flange 50.

Due to the fact that the flange 50 is separated from the upper, outer periphery of the plate 31 by means of spacing bosses, it will be apparent that the dehydrated pulp material gathers in this passage, out against the inner periphery of the housing 54. When any point on the periphery of the plate 31 passes the discharge slot 65 the dehydrated material is thrown outward against the hood 66 which tends to deflect it downward into a suitable container that might be provided or upon the table.

The juice which is drawn outwardly through the screen usually strikes upon the inner surface of the housing 54 and flows downward to the cup-shaped flange 57 where it is collected and led by means of the incline, indicated by the dotted lines in the drawings, to the discharge spout 53 and thence to suitable containers.

In some instances it has been noticed that when the piece of material being shredded has been grounded very thin, there is a tendency for the shredder element to pick up this piece and carry it in its rotary motion. To overcome this I have provided the corrugated under-surface of the housing so that these relatively thin pieces will likewise be reduced to pulp between the shredding surfaces 43 and 61. Occasionally these pieces pass to the outward periphery of the shredder element 41 and lodge against the flange 62. The fluted or corrugated skirt 46 now acts upon these pieces to further reduce them and throw them downward into the separator basket.

When it is desired to clean the device, the operator grasps the cover housing 54 between his hands and imparts a horizontal turning motion to the cover which turns upon the pins 56. When the cover has reached its limit of travel, which is regulated by the L-shaped slot 55, the cover may be lifted off the device and washed in a container or under a spray. The shredder element 41 is disengaged from the shaft 22 by pulling it upwardly and off the end of the shaft.

A key 39 in the bushing 38 is removed from engagement through the shaft 22 and the centrifugal, perforated bowl 48, and the spiral scraper blade 40 may be lifted upwardly and withdrawn from the shaft. By turning the centrifugal bowl 48 in a counterclockwise direction upon the pin headed bosses 36, the bowl may be separated from the plate 31, thus permitting the extraction of the spiral scraper element from the interior of the centrifugal bowl. It will be apparent that all of the operating parts of my machine which are subject to becoming spattered with juice or pulp are now readily accessible for washing in any suitable manner. For re-assembling the elements a reverse process is followed and the device is fitted together as it appears in Figure 2.

In certain instances it has been found necessary and advisable to alter the details of the shredding surface of the rotating shredder to handle certain fruits upon which my principles of extraction are to be operated. I therefore do not wish to be bound by the exact details of the disclosure herewith.

Having thus fully illustrated and described my invention, what I claim as new and desire to secure by Letters Patent is:

1. In a juice extractor, a perforated vertically rotatable extracting cylinder having a supporting bottom rotatable therewith, a spiral feeder rotatable within said cylinder, a shredder rotatable independent of said cylinder and feeding thereto, means for rotating said extracting cylinder, means for rotating said spiral feeder and said shredder at a speed differential to said extracting cylinder, and a casing enclosing said rotatable elements.

2. In a juice extractor, a vertically rotatable extractor bowl comprising a lower spinner plate, a perforated cylinder having an outwardly extending flange on the lower portion thereof, means for securing said cylinder to said spinner plate in spaced relation thereto, a spiral feeder rotatable within said cylinder, a shredder rotatable independently of said extractor bowl and discharging thereto, means for rotating said extractor bowl, means for rotating said spiral feeder and said shredder at a speed differential to said rotatable extractor bowl, and housing means enclosing said rotatable elements.

3. In a juice extractor, a vertically rotatable extractor bowl comprising a base plate, a perforated cylinder above said base plate, means for supporting said cylinder in spaced relation to said base plate, a spiral feeder rotatable within said cylinder, a rotatable shredder feeding into said extractor cylinder, means for rotating said extractor bowl, means for rotating the spiral scraper and said shredder at a speed differential to said extractor bowl, and a casing enclosing said rotatable elements, said casing including a juice collecting trough and also being provided with a pulp discharge opening aligned with the space between the base plate and the perforated cylinder supported thereabove.

4. In a juice extractor, a vertically rotatable perforated extractor cylinder, downwardly acting pulp feeding means within said cylinder, a frusto-conical shredder element rotatable in the upper mouth of said cylinder and independently thereof, said shredder comprising an upper web surface and an outwardly and downwardly flaring fluted skirt, means for rotating said extractor cylinder, means for rotating said shredder at a speed differential to said cylinder, and a casing enclosing said rotatable elements.

5. In a juice extractor, a vertically rotatable extractor bowl comprising a perforated cylinder having an upper inwardly converging edge and a lower exterior flange, a spinner plate for supporting said perforate cylinder, a plurality of bosses spaced around the periphery of said spinner plate and engaging the flange of the cylinder to lock the cylinder and the plate in spaced relation to each other to form a pulp discharge passage, means for rotating said spinner plate, a screw feed scraper rotatable within said cylinder, a shredder rotatable in the upper portion of said cylinder and comprising an upper corrugated web surface and an outward and downward flaring and fluted skirt, means for rotating said screw feed scraper and said shredder at a speed differential to said rotatable extraction cylinder, a casing enclosing said rotatable elements, said casing having interior means for the collection and discharge of juice, said casing also having means associated with said pulp discharge passage to retard the discharge of pulp therefrom and to permit the discharge of pulp at a predetermined point in the path defined by the rotatable extractor cylinder.

6. In a juice extractor, a vertical hollow shaft, a perforated extractor cylinder fixed to said shaft, means for rotating said shaft, an inner shaft within said hollow shaft, a spiral feeder fixed to the inner shaft and operable against the inner face of the extractor cylinder, a shredder secured to the inner shaft, means for rotating said inner shaft at a speed differential to said hollow shaft, a housing enclosing said extractor cylinder and said shredder and adapted to collect and discharge juice extracted by said cylinder, said housing also having a pulp discharge opening cooperating with the extractor cylinder, and a feed tube associated with said housing to one side of the axis of rotation of said shredder for the introduction of raw material to the shredder.

CLINTON G. KEITH.